Feb. 10, 1970 E. L. OLSON 3,494,072
DEVICES FOR SUPPORTING PLANTS
Filed July 10, 1967
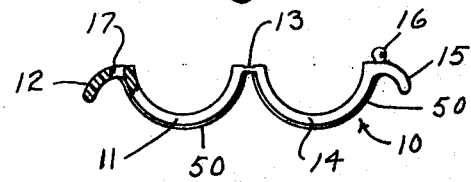
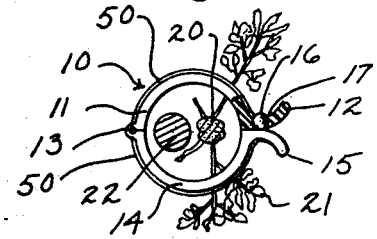
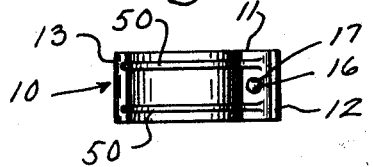
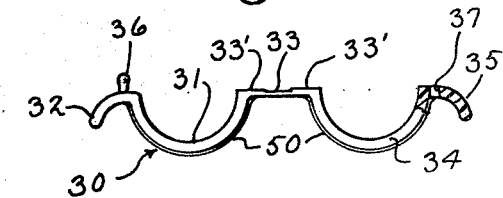
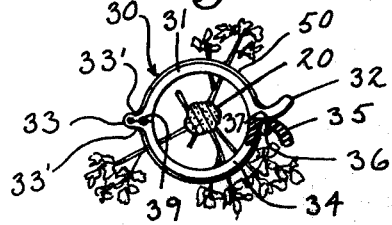
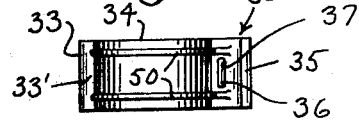
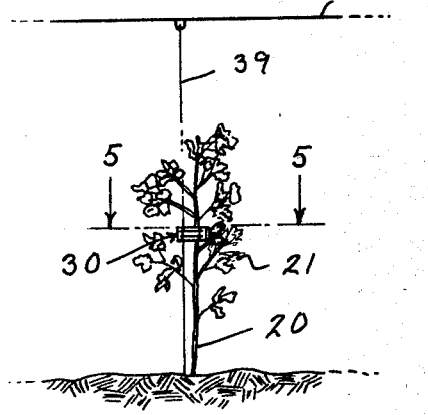
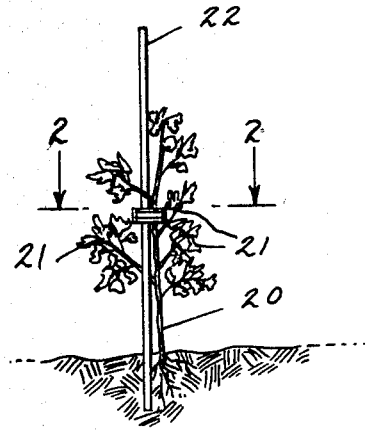
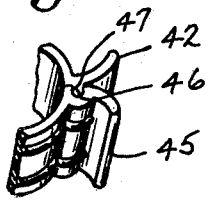
INVENTOR
EARLE L. OLSON
BY
Morsell & Morsell
ATTORNEYS //
United States Patent Office 3,494,072
Patented Feb. 10, 1970

3,494,072
DEVICES FOR SUPPORTING PLANTS
Earle L. Olson, Greendale, Wis., assignor to Famco Inc., Milwaukee, Wis., a corporation of Wisconsin
Filed July 10, 1967, Ser. No. 652,145
Int. Cl. A01g *17/14*
U.S. Cl. 47—44          2 Claims

ABSTRACT OF THE DISCLOSURE

A one-piece clip of flexible plastic having two semi-surrounding leg elements hinged together at their inner ends by a thin section of the same plastic material which hinge tends to urge the legs to open condition, there being interfitting locking elements on the other ends for holding the leg elements in closed condition and, in one form of the invention, there being gripping jaws at the hinge connection for gripping an elongated member such as a cord.

BACKGROUND OF THE INVENTION

Field of the invention

The present invention pertains particularly to means for supporting plants or flowers in an upright position while they are growing in order to promote the full development and growth of said plants.

Description of the prior art

The conventional practice of large scale commercial growers of tomatoes and other plants and flowers is to run a length of twine or wire above each row of plants and to tie the branches of each plant with pieces of twine suspended from said overhead line. Not only is this a time-consuming task, however, but weekly or at other regular intervals during the growth of the plants the branches must be untied and the twine supporting the same adjusted and re-tied to compensate for the growth of said plants. This repeated tieing and untieing of the plants is an extremely tedious chore, and the manual labor required in a larger-scale growing operation adds substantially to the grower's cost.

Heretofore attempts have been made to design clip-like supports for tomato and other plants and flowers which would be quickly and easily adjustable to compensate for plant growth. Unfortunately, however, said prior clip-type support devices have all been designed to clampingly engage on the stalk of the plant, which damages said stalk and frequently kills the plant, and said prior clip devices have proven unsatisfactory for their intended purpose.

SUMMARY OF THE INVENTION

The present invention provides an inexpensive clip device, preferably molded of plastic or similar flexible, low cost material, which is adapted to be used with an upright stake or vertically-suspended cord in encircling relationship to the stalk of a plant to prevent said plant from drooping downwardly, thereby promoting its growth and development.

The principal intended advantages of the novel clip comprising the present invention are that its initial installation on a plant can be accomplished simply and quickly, and without damage to the plant, and it can be readily adjusted and re-set when necessary to compensate for plant growth, thereby eliminating the time-consuming task of untieing and re-tieing the branches with twine every week or so during the growing period. It has been found, in fact, that the novel plant-supporting clips comprising the present invention can be adjusted and re-set in a fraction of the time required to adjust and manually tie said branches with twine.

A further feature of the present invention is that the novel clip comprising said invention is durable and long-lasting, and can be reused a number of times.

A further feature of the present invention is that the novel clip device can be advantageously utilized for numerous diverse uses, in addition to its principal intended use as a means for supporting plants and flowers.

Still further features and advantages of the present invention are that the novel clip device is simple in design and construction, it is reliable in use, and it is otherwise particularly well adapted for its intended purposes.

BRIEF DESCRIPTION OF THE DRAWINGS

In the drawing, wherein the same reefrence numerals designate the same or similar parts in all of the views:

FIG. 1 is a top plan view of the novel clip device in its open condition, a portion of said clip being broken away and shown in section;

FIG. 2 is a top plan view showing said clip in its closed condition and surrounding a plant and adjacent stake, said view being taken along line 2—2 of FIG. 9;

FIG. 3 is a side elevational view of said clip in its closed condition;

FIG. 4 is a top plan view of a modified form of clip device in an open condition, with a portion of said clip broken away and shown in section;

FIG. 5 is a top plan view showing the clip of FIG. 4 clampingly secured on a cord and encircling a plant, said view being taken along line 5—5 of FIG. 8;

FIG. 6 is a side elevational view of the clip illustrated in FIGS. 4 and 5;

FIG. 7 is a fragmentary perspective view showing a modified catch design that can be incorporated in the invention;

FIG. 8 is a side elevational view showing the clip of FIGS. 4–6 mounted on a cord and encircling the stalk of a plant; and FIG. 9 is a side elevational view showing the clip of FIGS. 1–3 surrounding a stake and adjacent plant.

DESCRIPTION OF THE PREFERRED EMBODIMENTS

Referring now more particularly to FIG. 1 of the drawing, the numeral 10 designates one style of the novel plant-supporting clip device comprising the present invention. Said clip is preferably molded in one piece of inexpensive flexible thermosetting plastic material with strengthening ribs 50. The important requisites of said material are that it be durable and long-lasting, flexible, and relatively inexpensive, there being several materials such as polypropylene, nylon and polyethylene, among other thermosetting plastic materials, which can be molded in one piece, as in FIG. 1, to provide the "live hinge" action. Metal may also be used but it is more expensive.

The form of the present clip illustrated in FIGS. 1–3 includes a first semi-surrounding leg element 11 having a short, oppositely-curved end projection 12 provided with a locking element such as the small circular opening 17 therethrough. Said first leg element 11 is attached to a second semi-surrounding leg element 14 by means of an integral hinge member 13, which hinge member connects outer surface portions only of the leg elements, and is of reduced thickness to permit said legs 11 and 14 to be readily swung together to form a closed ring, as shown in FIG. 2. During such swinging the inner axially-extending ends 9 move from the separated condition of FIG. 1 to the abutting condition of FIG. 2. Formed on the free end of the semi-surrounding leg 14 is a short, oppositely-curved end projection 15, and in the illustrated embodiment of the invention there is a ball 16 formed on the inner surface of said end projection.

When it is desired to use the clip 10 shown in FIGS. 1–3 to support a tomato plant or the like, as shown in FIGS. 2 and 9, a thin stake 22 of wood or other material is driven into the ground adjacent the plant and the curved legs 11 and 14 of said clip are manually urged together in surrounding relationship to the plant stalk 20 and stake 22. The ball 16 on the clip end portion 15 is then snapped through the opening 17 in the opposite end portion 12 of said clip. Said ball 16 is slightly larger than the opening 17 but the flexible nature of the material from which the present invention is formed permits the temporary deflection of said members during their joinder. The flexible nature of the clip material and the use of the thin plastic connection at 13 provides a "live" hinge action or spring tension tending to bias said clip toward its open position due to the fact that the clip was originally molded in the open condition of FIG. 1. When the lock or catch 16, 17 is snapped together the unit is securely retained in its closed condition of FIG. 2.

With the clip 10 locked in its closed position encircling the plant stalk, as described, the presence of the branches 21 thereunder prevent said clip from sliding downwardly on the plant. To remove said clip it is merely necessary to insert a finger between the diverging end portions 12 and 15 and force the same apart, thereby freeing the ball 16 from the opening 17 and permitting the arcuate legs 11 and 14 of the clip to swing apart to an open position toward which they are inherently urged by the hinge connection 13.

The principal purpose of the present invention, as hereinabove described, is to provide means for supporting tomato plants or the like, and when the clip 10 has been locked in its closed position surrounding the plant stalk 20 and adjacent stake 22 (FIG. 9) said plant is securely retained in an upright position. As the plant grows higher the clip 10 can be quickly and easily opened and repositioned further up on the stalk at periodic intervals, or additional clips can be positioned thereon, thereby eliminating the tedious and time-consuming chore of manually untieing, adjusting, and re-tieing the plants with twine, as is the present practice of most large scale growers and commercial florists.

Referring now to FIGS. 4–6 of the drawing, illustrated therein is a modified form of the novel plant-supporting clip comprising the present invention. As is shown in FIG. 4, said modified clip, which has been designated generally by the numeral 30, includes a first semi-surrounding, preferably semi-circular leg element 31 having a short oppositely-curved end portion 32 provided with a projecting latch 36 in the form of a bar. Said first leg element 31 is connected to a second semi-surrounding, preferably semi-circular leg element 34 by means of an integral thin plastic connection 33 at the outer ends of radially-extending enlargements 33' of the inner ends of the leg elements, forming clamping or gripping means. This permits said legs 31 and 34 to be readily swung together to form a ring. The hinge member 33 projects radially-outwardly further than the hinge 13 employed in the form of the invention illustrated in FIGS. 1–3, the purpose of which will be hereinafter seen.

Forming the free end of the leg element 34 is a short, oppositely-curved end projection 35, and formed in said end portion is a slot 37. When it is desired to lock the clip 30 in its closed condition it is merely necessary to snap the bar element 36 into said slot 37, and to open said clip the diverging end projections 32, 35 can be manually separated.

Still another modified catch or lock design is shown in FIG. 7 of the drawings. In this form of the invention the leg end portion 42 is provided with a protruding rib 46 extending across the entire width thereof and the other leg 45 is provided with a corresponding groove 47, said rib 46 being designed to snap fit within said groove 47 to provide a releasable locking assembly. While three different forms of integral catch means have been shown and described herein, the invention is not to be limited or confined in this respect. Numerous other modified locking assemblies could be employed and the invention is intended to cover not only the illustrated forms but also any and all variations or modifications thereof.

With respect now to FIG. 8 of the drawing, in the use of the clip 30 illustrated in FIGS. 4–6 a length of wire, string, or twine 38 is ordinarily strung above and along a line of plants, and a cord or twine 39 is suspended immediately adjacent each plant. As hereinabove described, said clip 30 is provided with a radially-projecting hinge member 33 and to mount the clip on the vertical cord 39 it is merely necessary to close said hinge member thereon, as shown in FIG. 5, said jaws 33' clampingly retaining said clip in a desired location on the cord. When the clip 30 has been positioned on said cord 39, the arcuate legs 31, 34 of said clip encircle the plant stalk 20 and retain said plant in an upright position. To adjust and reposition said clip 30 to keep pace with the growth of the plant said clip can be readily opened and shifted upwardly to a desired position on the cord 29 and reclamped thereon. The use of the cord gripping jaws 33' in the form of the invention is novel, regardless of the material of the clip, but plastic as described is the most practical and inexpensive and permits the forming of an integral hinge from the plastic material.

From the foregoing detailed description it will be seen that the present invention provides a novel plant-supporting device, preferably molded of plastic, which is designed to support a plant or flower without clamping onto and damaging the stalk. Moreover, said novel support can be quickly and easily adjusted at periodic intervals to compensate for plant growth, thus eliminating the tedious and time-consuming task of manually tieing and untieing the plants with twine during their growth period.

Further important features of the clip-type supporting device comprising the present invention are that it is durable and long-lasting, it is simple and inexpensive in design, and it is reliable in use.

It is to be understood, of course, that while several preferred embodiments of the present invention have been shown and described herein, numerous variations or modifications thereof will undoubtedly occur to those skilled in the art, and what is intended to be covered herein is not only the illustrated forms of the said invention but also any and all modified forms thereof.

It is also to be understood that while the novel clip device comprising the present invention is intended primarily for use in supporting plants or flowers, the invention is by no means to be limited in this respect. It is contemplated, for example, that said clip could be advantageously utilized for numerous other purposes such as securing the signal light cord to a hospital bed, or for holding tubing in a hospital for intravenous feedings, or transfusions, or for holding electrical wiring in position, as well as other assorted uses. In short, it is intended to cover not only the embodiments of the present invention herein described and illustrated, but also any and all other forms and uses thereof as may come within the spirit of said invention, and within the scope of the following claims.

What I claim is:

1. A one-piece clip molded of resilient and flexible plastic material, comprising: a first substantially semi-circular leg element having an inner end and having an oppositely-curved extreme outer end portion; a second substantially semi-circular leg element having an inner end and having an oppositely-curved extreme outer end portion; an integral plastic hinge means of reduced thickness connecting outer surface portions only of the inner ends of said first and second leg elements and inherently urging said leg elements to an open position with said outer end portions separated, said leg elements being adapted to be manually swung about said hinge connection to a closed position with their outer end portions abutting to form a substantially circular enclosure with said oppositely-curved extreme outer end portions diverging; and interfitting snap lock means adjacent the outer end portions of said leg elements for releasably securing said clip in said closed position, the nature of said resilient and flexible plastic material permitting the yieldable engagement of said interfitting lock means when said clip is in its closed position, and the diverging nature of said leg extreme outer end portions permitting a finger to be inserted therebetween to pry said clip open.

2. The clip recited in claim 1 wherein said leg inner ends are shaped to provide coacting clamping means for gripping an elongated, axially-extending element when said clip is closed.

References Cited

UNITED STATES PATENTS

| 878,494 | 2/1908 | Basse | 47—44 |
| 2,818,871 | 1/1958 | Beaudry | 132—48 |
| 2,885,758 | 5/1959 | Russo et al. | |

FOREIGN PATENTS

| 26,657 | 11/1912 | Great Britain. |
| 864,348 | 4/1961 | Great Britain. |
| 975,266 | 10/1950 | France. |
| 1,208,545 | 1/1966 | Germany. |
| 354,979 | 7/1961 | Switzerland. |

ROBERT E. BAGWILL, Primary Examiner

U.S. Cl. X.R.

40—21; 24—256; 132—48